United States Patent [19]
Pinna

[11] 3,782,365
[45] Jan. 1, 1974

[54] DETECTOR FOR LOCATING VEINS IN LIVING BODIES

[76] Inventor: Sanford Pinna, 500 68th Ave. South, St. Petersburg, Fla. 33712

[22] Filed: Mar. 13, 1973

[21] Appl. No.: 340,924

Related U.S. Application Data

[63] 1.

[52] U.S. Cl.............. 128/2 R, 73/81, 73/DIG. 4, 128/2.05 N, 128/2.05 E, 128/2 T
[51] Int. Cl................................ A61b 5/00
[58] Field of Search.................. 128/2 T, 2 R, 2 S, 128/2.05 N, 2.05 E, 2.05 P, 2.05 T; 73/81, 85, DIG. 4

[56] References Cited
UNITED STATES PATENTS

| 749,854 | 1/1904 | Fahrney | 128/2.05 P |
|---|---|---|---|
| 2,708,928 | 5/1955 | Zenatti | 128/2.05 N |
| 3,086,132 | 4/1963 | Ostrow | 73/DIG. 4 |
| 2,834,202 | 5/1958 | Cook | 73/81 |
| 3,704,708 | 12/1972 | Iberall | 128/2.05 E |
| 3,745,989 | 7/1973 | Pinna | 128/2.05 N |

*Primary Examiner*—Aldrich F. Medbery
*Attorney*—Thomas B. Van Poole et al.

[57] ABSTRACT

A casing is provided with an elongated sensor rod and a marking rod mounted for axial reciprocation by a motor driven cam through compression springs so that the sensor is moved outwardly of the casing by a pulsating force with the end of the sensor engaging a living body so that the compressive force on the sensor depends on the resistance of the body, a latch release lug is held in latched position by an electromagnet controlled through a piezo crystal in the sensor for releasing the latch when compressive force on the sensor goes below a given level to release a spring urged marking rod for outward movement to mark the surface of the body in response to lessened resistance to outward movement of the sensor and consequent compressive force on the sensor occasioned by a vein positioned beneath the sensor.

7 Claims, 3 Drawing Figures

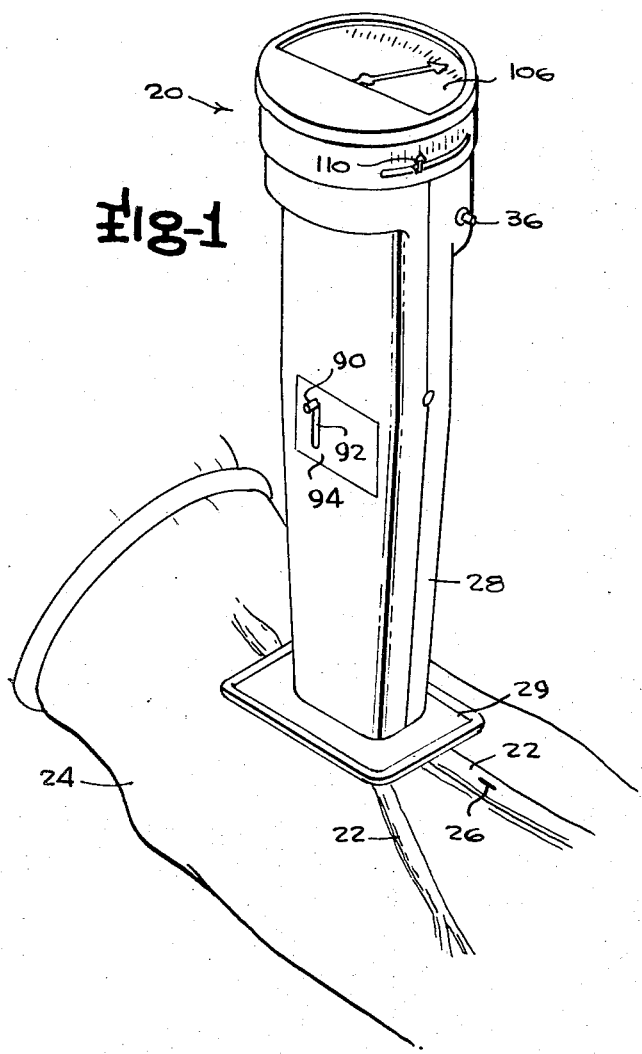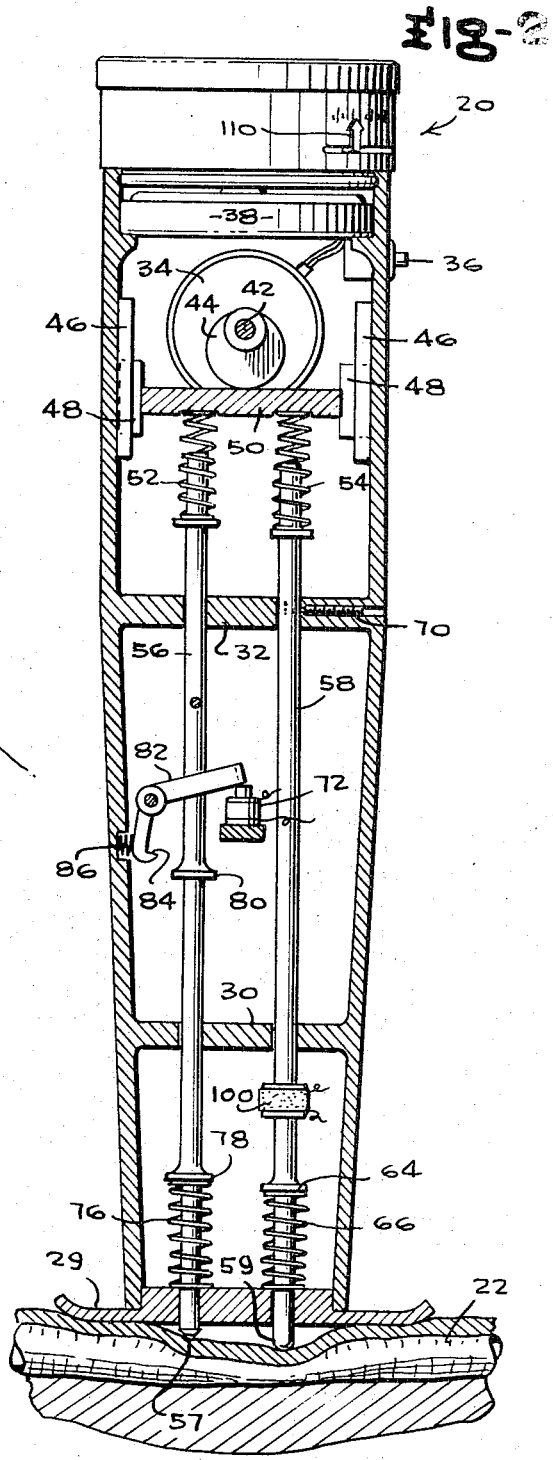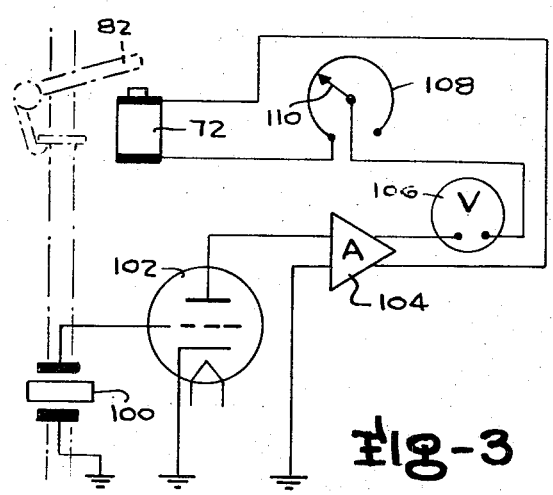

DETECTOR FOR LOCATING VEINS IN LIVING BODIES

This application is a continuation-in-part of earlier filed application Ser. No. 247,781 filed Apr. 26, 1972 and now U.S. Pat. No 3,745,989.

This invention is in the field of surgical implements and the like, and is specifically directed to a uniquely simple, yet effective, means for detecting the location of a vein in a living body.

Various medical procedures require determination of the exact location of a vein beneath the surface of the skin of a living body, and such detection is frequently difficult or impossible to make visually. Consequently, a hit or miss approach by insertion of a needle into the body is frequently resorted to, to the consequent discomforture of the patient. Moreover, and even more seriously, delays in locating a vein can, in some instances, have disastrous and possible fatal medical effects.

The foregoing problems have been recognized by those of skill in the art, and a number of devices have been proposed for aiding in the solution thereof. For example, U. S. Pat. No. 3,556,079 discloses a complicated apparatus and method of operation employing ultrasonic means for detecting a vein. Other devices have also been proposed; however, such devices have met with only limited success and have frequently involved highly sophisticated and consequently expensive apparatus which must of necessity be employed in a hospital or other fixed location.

Consequently, up until the time of the present invention there had been a continuing need for a simple, reliable and economical means of accurately detecting the position of a vein in a living body.

It is consequently the primary object of this invention to provide a new and improved means for detecting veins in living bodies.

The obtainment of the object of this invention is enabled through the provision of a casing in which a sensor member in the form of an elongated rod is mounted for axial reciprocation. In addition, an elongated marking rod having a marker containing ink or the like on one end is also mounted for axial reciprocation in the casing with the two rod members being substantially close to each other and in parallel orientation. An electric motor drives an eccentric cam engageable with a floating bearing plate with a compression spring extending between the bearing plate and the sensor rod member, so that reciprocating motion of the bearing plate causes the compression spring to compress and consequently urge the sensor rod outwardly with respect to the casing.

The sensor rod includes a pressure sensitive solid state transducer as a portion of the rod in the form of a piezo crystal intermediate the ends of the sensor rod. Compressive force exerted on the sensor rod results in a variable voltage from the piezo crystal which is used to control the output of an amplifier which is coaxially connected to an electromagnet. The electromagnet is mounted adjacent a latch member which is provided to retain a marking rod within the casing in a retracted position. When the end of the sensor rod is positioned against the skin of a living body, the depth to which the sensor rod will move into and toward the body without puncturing the skin is determined in accordance with the softness of the body portion beneath the skin engaged by the sensor rod. If a vein is positioned beneath the end of the sensor rod, the rod will move outward at a greater distance and will be under less compressive force than it would be if no vein were beneath the end of the sensor rod. Consequently, the lesser compressive force on the sensor rod indicates that a vein is positioned beneath the end of the sensor rod and the amplifier consequently actuates an electromagnet which releases the latch member to permit the marking rod to move outwardly to its outermost position in which a marking means on the end of the marking rod engages the skin of the body to mark the position of the detected vein.

A better understanding of the subject invention will be enabled when the following written description is read in conjunction with the appended drawings in which:

FIG. 1 is a perspective view illustrating the manner of use of the preferred embodiment of the invention;

FIG. 2 is a bisecting sectional view of the preferred embodiment; and

FIG. 3 is a schematic diagram of the control circuitry for the preferred embodiment.

Attention is initially invited to FIG. 1 of the drawing which illustrates the preferred embodiment of the invention 20 in use in conjunction with a human arm 24 for detecting veins 22 in the arm. The device provides a mark 26 in alignment with a detected vein.

A two-part split casing member 28 of elongated, generally rectangular configuration encloses and supports the working components of the preferred embodiment with the casing including a base plate 29, a lower apertured guide web 30 and an upper apertured guide web 32.

The upper end of the casing 28 is enlarged and is of adequate cross-sectional area to enclose an electric motor 34 fixed to the casing and connected in series with a push button switch 36 and a battery 38. Access to battery 38 is provided by means of a removable circuit control unit enclosure 39 having an end cap 40 threadably received on its upper end. Electric motor 34 is provided with an output shaft 42 to which an eccentric cam 44 is connected.

Slide bearing lugs 46 extend endwardly from the walls of the casing 28 on opposite sides of the casing to define a guide slot on opposite sides of the casing in which a pair of slide members 48 are positioned. These components are shown in FIG. 2. Slide members 48 are connected to a floating cam follower plate 50 which is consequently guided for reciprocating up and down movement in an obvious manner.

Floating cam follower plate 50 engages the eccentric cam 44 and is urged upwardly by first and second compression springs 52 and 54 which extend from the lower surface of the cam follower plate 50 and respectively have their lower ends encircling a marking rod 56 and a sensor rod 58 having a lower rounded end tip portion 59. Marking rod 56 is provided with a radial flange 60 and the sensor rod 58 is provided with a radial flange 62 with both of the radial flanges serving to retain the springs 52 and 54 in position so that rods 56 and 58 are both continuously urged downwardly by their respective compression springs with which they are engaged. In addition, marking rod 56 includes an ink impregnated tip pad or the like 57 on its lower end for applying a mark 26 (FIG. 1) to the skin surface.

Sensor rod 58 is supported in the upper and lower guide webs 32 and 30 and base plate 29 for axial reciprocation as shown in FIG. 2 and includes a lower radial flange 64. A sensor rod return spring 66 extends between the base plate 29 and the lower radial flange 64 for urging the sensor rod upwardly in an obvious manner. Therefore, it will be seen that the compression spring 66 urges the sensor rod upwardly. Springs 52 and 54 are of insufficient strength to overcome the force of spring 66 and a marking rod return spring 76 respectively, when follower plate 50 is in its uppermost position; however, movement of plate 50 to its lowermost position compresses springs 52 and 54 so that the downward force exerted by springs 52 and 54 exceeds the upward force of springs 76 and 66 respectively.

A slot 68 is provided along the length of an upper portion of the sensor rod with the end of a set or guide screw member 70 extending into the slot to prevent rotation of the rod 58 while permitting axial reciprocation of the rod caused by up and down movement of the floating cam follower plate 50. It should be noted that the downward movement of the rod is provided by a substantial urging force from the compression spring 54.

Marking rod 56 is mounted for reciprocating vertical movement by virtue of the fact that it extends through apertures in the upper web 32, the lower web 30, and the base plate 29. Similarly, the marking rod also includes the marking rod return spring 76 compressed between a lower flange 78 and the base plate 29. A centrally located latch flange 80 is provided on the marking rod 56 and a latch member 82 in the form of a pivotal bell crank is provided with a latching surface 84 movable into position beneath the latch flange 80 by a small coiled compression spring 86.

A manual return pin 90 extends radially from the marking rod 56 outwardly through a slot 92 in an access plate 94 in the casing 28 for enabling a positioning of the marking rod in an upper latched position in which its lower end does not extend from beneath base plate 29. The latch 82 is pivoted counter-clockwise from its FIG. 2 position by spring 86 so that surface 84 engages and retains the marking rod 56 in its upper position with the marking means 57 inside the casing. However, an electromagnet 72 is positioned adjacent latch 64 so that actuation of the electromagnet will cause the latch member 82 to pivot clockwise and release the marking rod 56 so that the marking rod 56 is free to move outwardly of the base plate 29 under the urging of springs 52 to mark the surface of the body beneath the marking rod.

A piezo crystal 100 is mounted in and forms a part of the sensor rod 58 and is connected as a part of the control circuitry illustrated in FIG. 3 with one output being to the grid of a triode 102 which is in turn connected to an amplifier 104 the output of which is connected through a voltmeter 106 and a variable rheostat 108 to the electromagnet 72.

Rheostat 108 includes a manually operable member 110 for varying the resistance of the rheostat in a conventional manner with the member 110 being illustrated in FIG. 1 in the upper portion of the preferred embodiment for enabling manual adjustment in an obvious manner. It should be noted that upon the output from the amplifier reaching a given level, the electromagnet 72 will be actuated to pivot the latch member 82 from the dotted line position illustrated in FIG. 3 clockwise to the position illustrated in FIG. 2 so as to consequently release the marking rod member 56 for outward movement to provide a mark 26 on the skin above the vein member 22. While a triode 102 is illustrated, it should be understood that the triode function can be provided by a solid state transistor.

During a cycle of operation, the marking member 56 is in its latched position and the push button 36 is actuated to provide power to the control circuit of FIG. 3 and to cause the electric motor 34 to rotate the eccentric cam 44 to provide an up to down reciprocation of the floating cam follower plate 50. The reciprocation of the cam follower plate 50 provides a downward force against the upper end of the compression spring 54. The total compressive force on the sensor rod 58 will obviously vary in accordance with the resistance of the body beneath the end tip 59 and movement of the end tip 59 over a softer body area such as would occur when a vein is beneath the tip 59 varies the output from the piezo crystal 100 to consequently trigger the electromagnet 72 and release the latch 82. Therefore, it will be readily apparent that the detection of the softer body area will result in the application of a mark 26 to the skin surface above the vein member 22.

Upon completion of a vein sensing operation, the marking rod 56 is returned to its upper latched position by manual upward movement of the member 90 in an obvious manner. Since switch 36 would be open at such time and no power would be supplied to the control circuit, the electromagnet 72 would not be activated and the latch 82 would consequently remain in its latched position. The visible voltmeter 106 and the manual rheostat adjustment means 110 enable a monitoring of the operation of the device as well as a variation in the sensitivity of operation. In other words, adjustment of the member 110 varies the resistance point of the body member at which the marking member will be released.

Numerous modifications of the preferred embodiment will undoubtedly occur to those of skill in the art. For example, auditory means such as a sound buzzer can be provided for providing an audible signal in response to the detection of the vein. In would also be possible to provide a visual indicator such as a light or the like. In addition, it should be understood that the invention is not restricted to the employment of an electric motor for providing the downward force for the sensor nor is the invention restricted to the employment of a pulsating downward force since it would be possible to use mechanical means for positioning the eccentric cam 44 in a fixed position to provide a constant value force on rod 56. It should also be understood that usefulness of the invention is not limited to the detection of veins in that it would be useful in locating other fluid bearing bodies or fluid cavities in the body such as cysts of the breasts, abscesses, arteriovenous fistulas, hemangiomas or the like.

Therefore, it should be understood that the spirit and scope of the invention is to be limited solely in light of the appended claims.

I claim:

1. A device for locating veins in a living body, comprising a casing, a sensor member comprising an elongated rod having a pressure sensitive piezo crystal as a portion thereof and having an outer end mounted for movement outwardly of said casing adjacent one end of said casing, force exerting means for exerting a predetermined force on said sensor member urging said outer end of said sensor member outwardly from said casing so that compressive force on said sensor member resultant from resistance of the body to movement of the sensor member will vary in accordance with the resistance of the body with which the sensor member is engaged so that the compressive force on said sensor member will be greater when there is no vein beneath the sensor member than when there is a vein beneath the sensor member and position identifying means comprising marking means for placing a visible mark on said living body at a location adjacent the location at which the elongated rod engages said body in response to the detection by said piezo crystal of a lower level of compressive force on said sensor rod for apprising the user of the presence and location of a vein beneath the sensor member.

2. The invention of claim 1 wherein said marking means comprises a marking element normally retained in a retracted position in said casing, marking spring means urging said marking element in a direction outwardly of said casing toward an extended position, latch means for holding said marking element in said retracted position and additionally including an electromagnet latch release means positioned adjacent said latch member for releasing said latch upon actuation of said electromagnet and electrical circuit means connected to said electromagnet from said piezo crystal for actuating said electromagnet upon detection of a given low level compressive force on said elongated rod.

3. The invention of claim 2 additionally including a compression spring engaging said elongated rod for urging said elongated rod inwardly of said casing.

4. The invention of claim 3 additionally including a marker return spring engaging said marking member and urging said marking member towards its retracted position.

5. The invention of claim 2 wherein said electrical circuit means includes manually adjustable means for enabling selective adjustment of the given low level compressive force on said rod at which the electromagnet latch release will be actuated.

6. The invention of claim 5 additionally including a compression spring engaging said elongated rod for urging said elongated rod inwardly of said casing.

7. The invention of claim 6 additionally including a marker return spring engaging said marking member and urging said marking member towards its retracted position.

* * * * *